(12) United States Patent
Fan (10) Patent No.: US 8,752,802 B1
(45) Date of Patent: Jun. 17, 2014

(54) CLAMPING DEVICE ADAPTED TO ELECTRONIC PRODUCT OF DIFFERENT DIMENSIONS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 13/779,337

(22) Filed: Feb. 27, 2013

(51) Int. Cl.
*H04M 1/00* (2006.01)

(52) U.S. Cl.
USPC .................. 248/316.1; 248/309.1; 379/455

(58) Field of Classification Search
USPC .......... 248/309.1, 311.2, 311.3, 316.1, 316.7, 248/177.1, 187.1, 172, 173, 170, 171, 434, 248/435; 224/545, 547, 929, 930; 379/454, 379/455
See application file for complete search history.

(56) References Cited

U.S. PATENT DOCUMENTS

| | | | | |
|---|---|---|---|---|
| 5,615,258 A | * | 3/1997 | Ho | 379/446 |
| 6,834,199 B2 | * | 12/2004 | Hyun et al. | 455/575.1 |
| 6,966,533 B1 | * | 11/2005 | Kalis et al. | 248/316.4 |
| 7,925,320 B2 | * | 4/2011 | Pemble et al. | 455/575.9 |
| 8,027,464 B2 | * | 9/2011 | Piekarz | 379/455 |
| D646,674 S | * | 10/2011 | Liao | D14/253 |
| D684,979 S | * | 6/2013 | Chun | D14/447 |

* cited by examiner

*Primary Examiner* — Steven Marsh
(74) *Attorney, Agent, or Firm* — Rabin & Berdo, P.C.

(57) ABSTRACT

A clamping device adapted to electronic product of different dimensions, includes a base unit, a clamping member, two stoppers, a moving unit, a release unit, and two rotation units. The base unit is used for placing an electronic product on it. The clamping member clamps the electronic product by the manner of closing the stoppers. The clamp member is installed on the moving unit. The moving unit adjusts the position of the clamping member by the manner of straight moving. The two stoppers are installed on the corresponding rotation units, respectively. The two rotation units adjust positions of the two stoppers by rotary manner. The release unit may release the state of clamping the electronic product. The clamping device clamps the electronic product of different dimensions through a variety of positions of the clamping member and the two stoppers.

8 Claims, 9 Drawing Sheets

CLAMPING DEVICE ADAPTED TO ELECTRONIC PRODUCT OF DIFFERENT DIMENSIONS

TECHNICAL FIELD

The disclosure generally relates to clamping device adapted to electronic product of different dimensions.

BACKGROUND

Currently most of a variety of digital video and audio data may be downloaded through the Internet. Many people often store downloaded related file in a portable electronic product, such as smart phone, tablet computer, etc., and then watch videos directly on the portable electronic product. When watching video for long time, it is preferable to have a clamping device, or a supporting device to assist holding the portable electronic product. Currently the applicable clamping device adapted to portable electronic product usually only applies to single kind product of different dimensions, for example, 6 to 8-inch tablet computer, 3 to 5-inch smart phone . . . , the capable range difference for clamping device is small, unable to apply to a variety of products. Clamping effectiveness for some big screen products, such as tablet computer is not solid, therefore currently there is a few clamping device adapted to both the wide-screen tablet computer and rectangular mobile phone. According to the above mentioned, the disclosure of the invention provides a clamping device adapted to various types of portable electronic product.

SUMMARY

The exemplary embodiment of the present invention may provide a clamping device for various electronic products; the clamping method mainly uses three clamping points for fixing so that capable clamping range is 4 inches to 10 inches. Thus the clamping device is suitable for tablet computer, smart phone, and various portable electronic products.

To achieve the above objective, the present invention mainly comprises a base unit, a clamping member, two stoppers, a moving unit, a release unit, and two rotation units. The base unit has a placement surface; the placement surface is used for placing an electronic product; the clamp member and the stopper are located respectively at both sides of the placement surface, the clamp member may move close to or away from the stoppers, so that the electronic product is clamped between the clamp member and the two stoppers; the moving unit partially penetrates the base unit and moves linearly; the clamp member is installed on the moving unit, wherein the installation location is the section that the moving unit not entering the base unit; furthermore the bottom of the clamp member extends into the moving unit for short range movement opposite to clamping direction; the moving unit having an elastic member, the elastic member provides the restore power after the clamp member changes position; the release unit is installed on the base unit, is able to release the clamping state of the clamp member; each rotation unit having two ends, wherein one end pivotally connects the base unit, and the other stands the stopper; the two rotation units take pivotal connection as the center for said two stopper positions may move close to or away from each other.

The present invention uses the design of the moving unit penetrating the base unit to increase the adjustable distance of the moving unit, and may reach 1 times or 1.5 times or more of length of the base unit, so that the adjusted clamping range for the clamping member installed on the moving unit may be relatively expanded to meet demand of adapting a variety of different electronic products.

Furthermore, although the clamping member of the invention is installed at the moving unit, the clamping is able to move opposite to the clamping direction for a short distance. This design has two purposes: increasing the clamping range; and on the condition of the release unit releasing the clamping state, the moving unit may move due to the operation of the elastic member, such that the width between the clamping member and the stopper is larger than the electronic product to facilitate removal of the electronic product.

The foregoing and other features, aspects and advantages of the present invention will become better understood from a careful reading of a detailed description provided herein below with appropriate reference to the accompanying drawings.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION OF THE EXEMPLARY EMBODIMENTS

Figure 1:
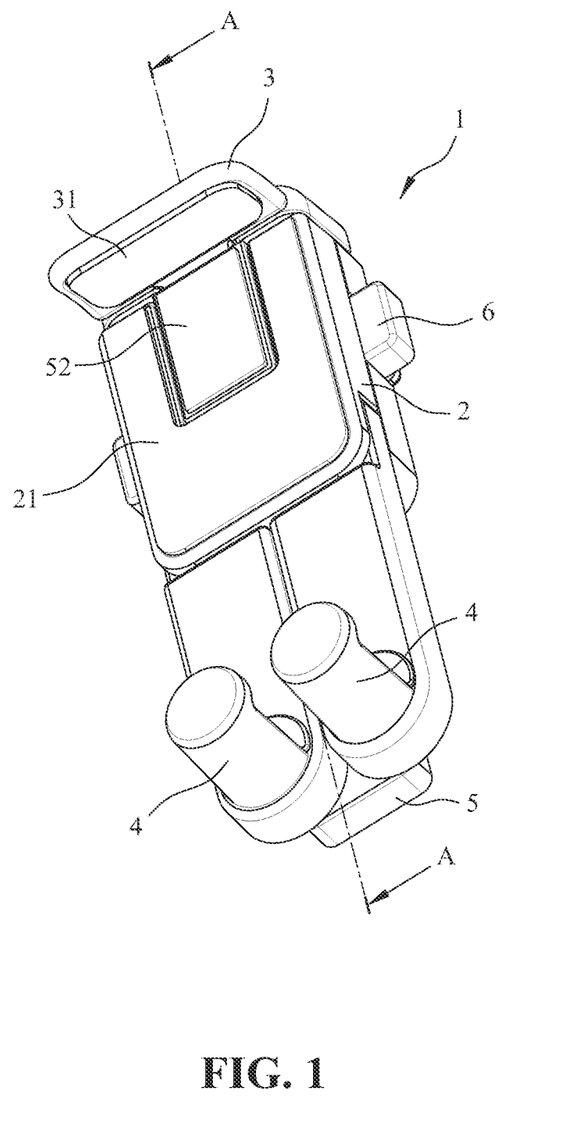
FIG. 1 illustrates three-dimensional view of folded state, according to an exemplary embodiment.
Figure 2:
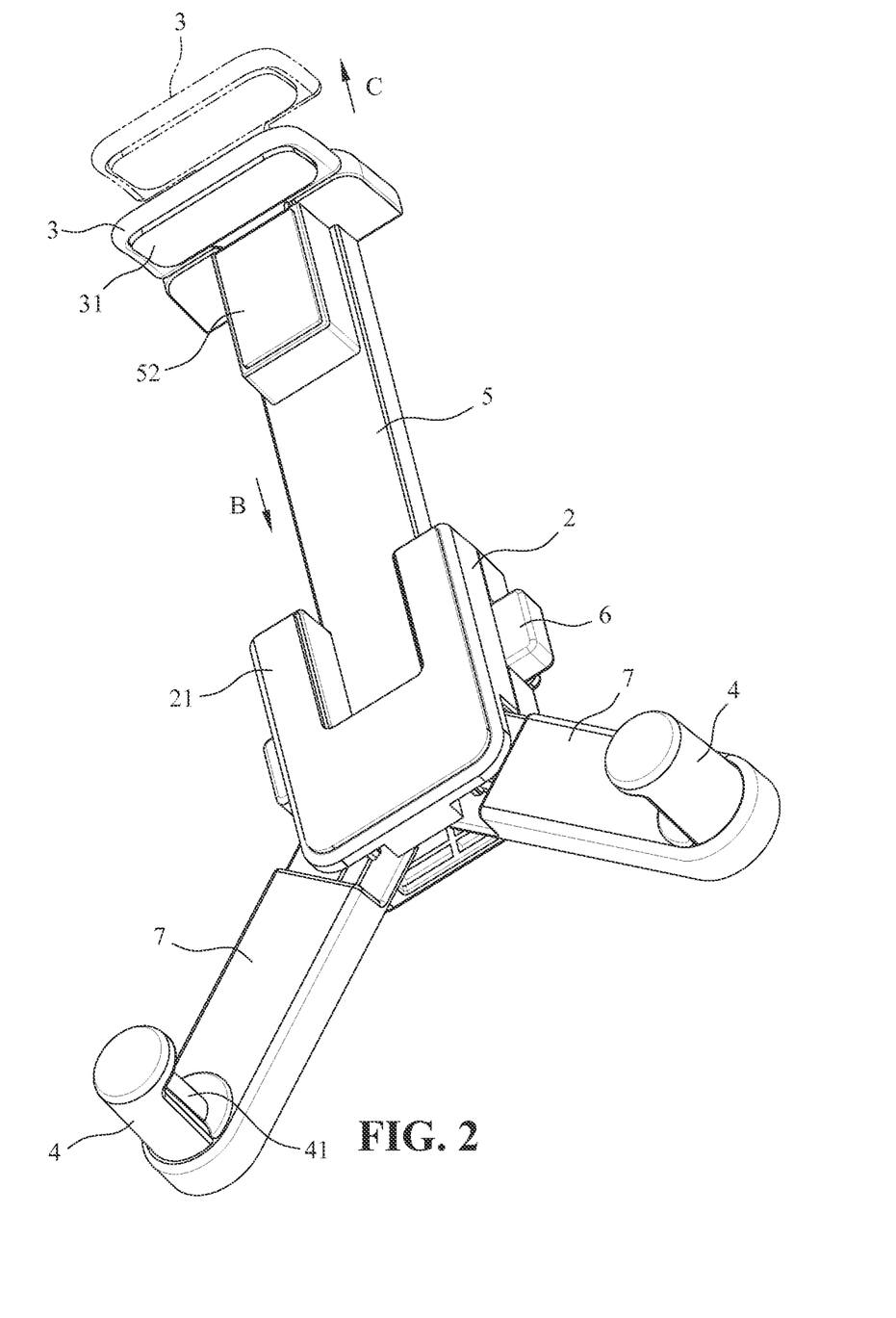
FIG. 2 illustrates three-dimensional view of expanded state, according to an exemplary embodiment.

The exemplary embodiment of the present disclosure may provide clamping device for electronic product of different dimensions. The folded and unfolded state of the present disclosure is shown in FIGS. 1 and 2, according to an exemplary embodiment. The clamping device 1 of the present disclosure mainly includes a base unit 2, a clamping member 3, two stoppers 4, a moving unit 5, a release unit 6, and two rotation units 7.

The base unit 2 has a placement surface 21, the placement surface 21 is used for placing an electronic product. The base unit 2 is shaped with a rectangular hollow cartridge body; the moving unit 5 penetrates the structure. The release unit 6 has an interlocking mechanism hiding in it, the rotation units 7 are pivotally connected thereto.

The clamping member 3 and the two stoppers 4 are respectively located at both sides of the placement surface 21. The exemplary embodiment of the present invention uses the clamp member 3 close to the stoppers 4 to clamp the electronic product, and the clamp member 3 away from the stoppers 4 to release the clamping state and to remove the electronic product from the base unit 2. Wherein the clamping member 3 is installed on the moving unit 5, the moving unit 5 adjusts the position of the clamping member 3 by the manner of straight moving, so the clamping surface 31 of the clamping member 3 is a plane or similar planar shape, the location area of the clamping surface 31 area is constituted by a sponge or material of a high friction coefficient. Each of the stoppers 4 is installed on the corresponding rotation unit 7, the rotation units 7 rotate to adjust the position of the stoppers 4, so that the clamping surface 41 of the stopper 4 is a circular arc surface, the location area of the clamping surface 31 area is constituted by a sponge or material of a high friction coefficient.

The moving unit 5 partly penetrates the base unit 2 and moves linearly. The clamp member 3 is installed on the moving unit 5, the installation position is section of the moving unit 5 not entering the base unit 2. The moving length of moving unit 5 is more than 1 times of the length of the base unit 2, or even up to 1.5 times or more. When the position of the moving unit 5 changes, the position of the clamp member 3 also changes; thus the clamping range is larger than the conventional clamping device. The release unit 6 is responsible for whether the position of the moving unit 5 is fixed or not, the structure of this part is same as the ratchet tooth, the moving unit 5 only moves according to the clamping direction (as indicated by arrow B), and the opposite direction may be done by releasing through the release unit 6, which is similar to the prior art and is described in following paragraphs.

Figure 3:
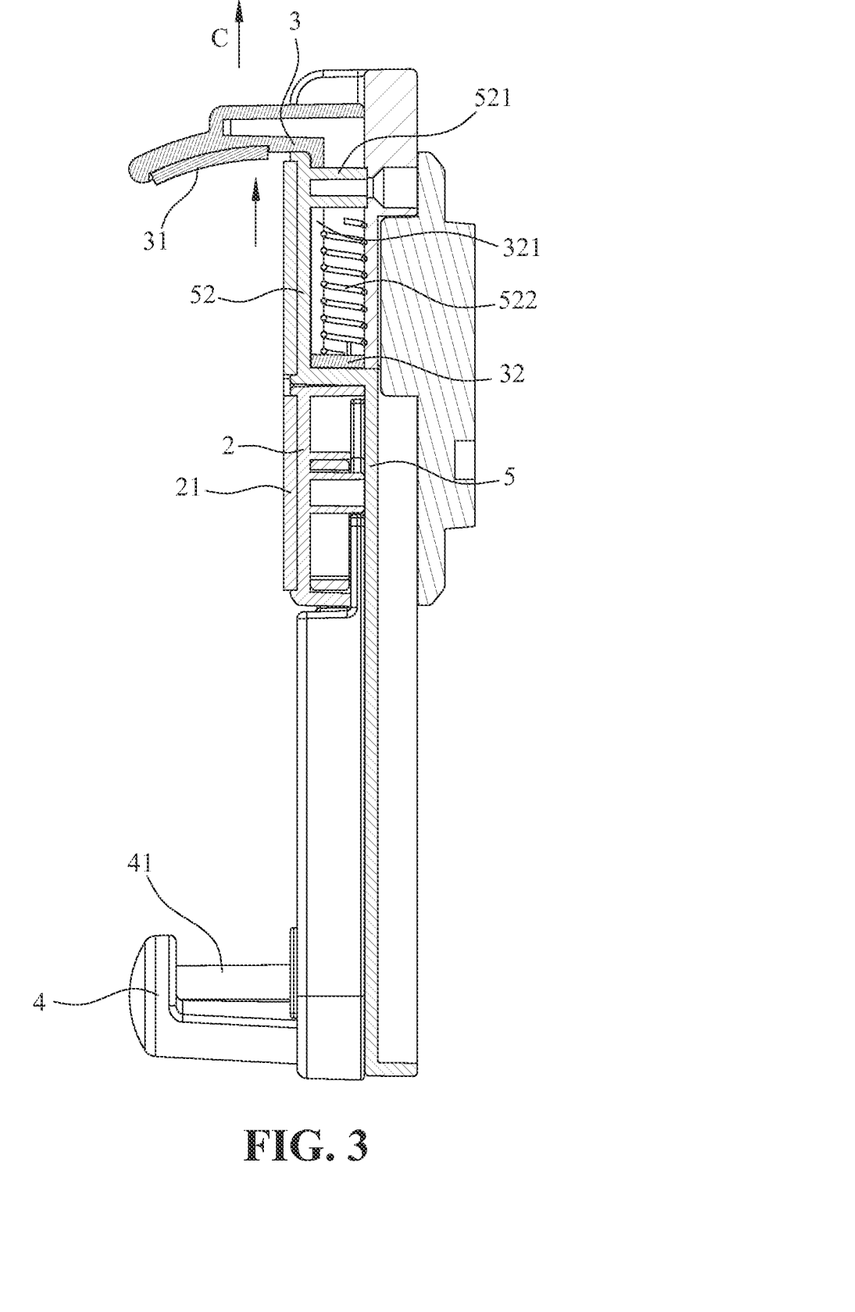
FIG. 3 illustrates AA sectional view of FIG. 1, according to an exemplary embodiment.

As shown in FIGS. 2 and 3, the side view of the clamping member 3, such as L-type, illustrates that the bottom of the clamping member extends into the moving unit 5, and the clamping member is able to move linearly with short distance. In the exemplary embodiment of the present disclosure, the moving unit 5 has a housing case 52, and the housing case 52 is located at the section of the moving unit 5 not entering the base unit 2. The bottom of the clamping member 3 has a slider 32, and the slider 32 extends into the housing case 52, so that the clamping member 3 may move with short distance opposite to the clamping direction (such as the direction of arrow C). Also the housing case 52 has at least one positioning member 521, the positioning member 521 penetrates through the elongated guide hole 321 on the slider 32, thus the slider 32 is able to slide without departing from the housing case 52. The housing case 52 has an elastic member 522, and the elastic member 522 is a spring and provides restore power after the clamp member 3 changes position.

Figure 4:
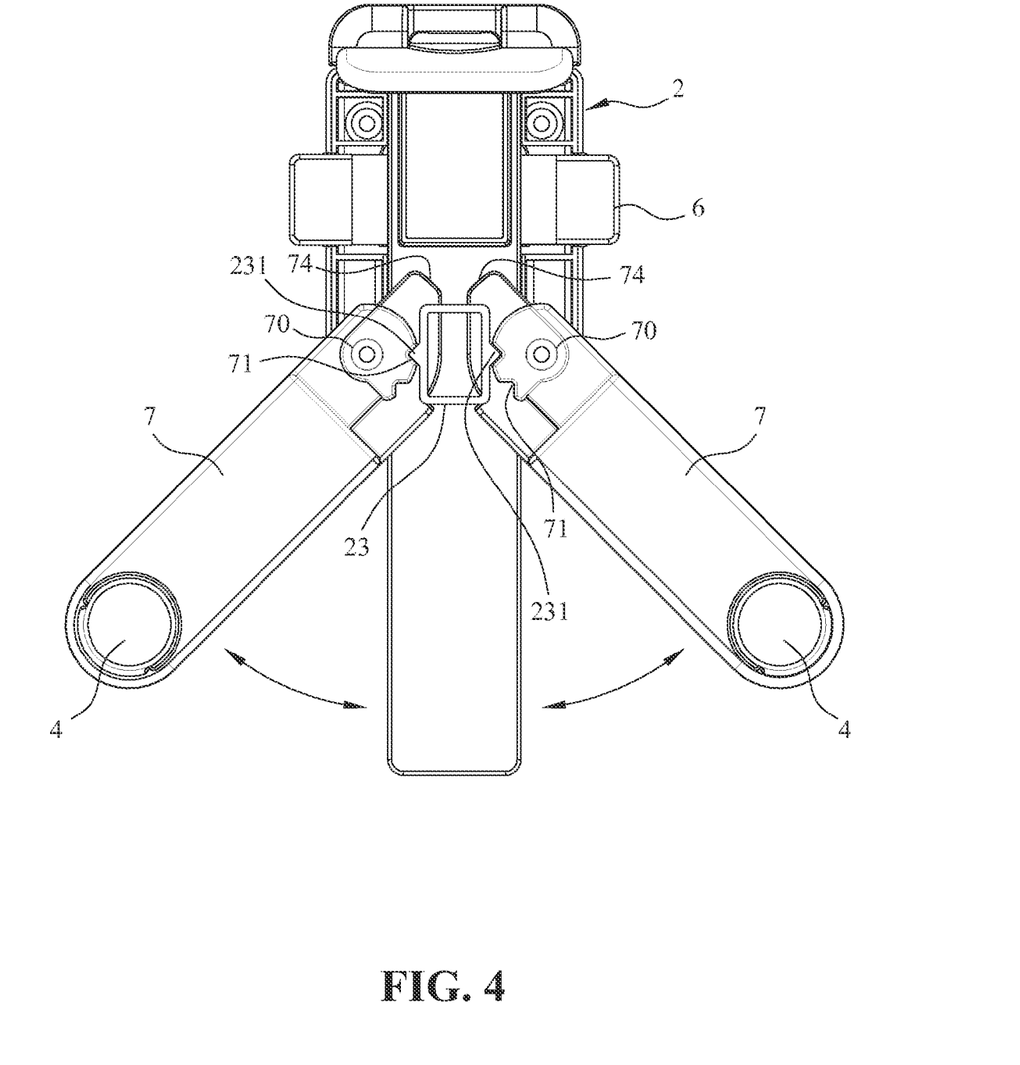
FIG. 4 illustrates a schematic view for the internal structure of the base unit, according to an exemplary embodiment.

According to the exemplary embodiment, FIG. 4 shows a schematic view for the internal structure of the base unit 2 to illustrate the coupling relation of the rotation unit 7 and the base unit 2. Each of the rotation units 7 has two ends, wherein one end pivotally connects the base unit 2, the other end stands the stoppers 4, and the two rotation units 7 take pivotally connected end 70 as the center, allowing the two stoppers 4 to be close to or away from each other. The rotation unit 7 can be positioned as follows. The periphery of the pivotally connected end of the rotation unit 7 has a number of cogging 71, and the base unit 2 has a latch 23, the latch 23 is an annular type, the two opposite edges have a convex tooth 231. The position of the latch 23 is fixed by other member (not shown) of the base unit 2, but the location of the convex tooth 231 may be compressed with offset, having the effect similar to elastomeric. By latching the convex tooth 231 in the cogging 71 at different positions of the rotation unit 7, the rotation unit 7 has two different adjustment positions, thus may change the position of the stoppers 4, thereby control the clamping range and clamping position between the clamping member 3 and the stoppers 4. Also pivotally connected end of the rotation unit 7 has a safety contact wall 74, the safety contact wall 74 and the cogging 71 are located at different heights, respectively. As the surface direction shown in FIG. 4, the location of the safety contact wall 74 is deeper than location of the cogging 71, and the safety contact wall 74 also does not interfere with the operation of the latch 23. When the safety contact wall 74 of the two rotation units 7 are contacted with each other, it is indicating that the opening angle of both rotation units 7 is too large, then may not be further rotated.

Figure 5:
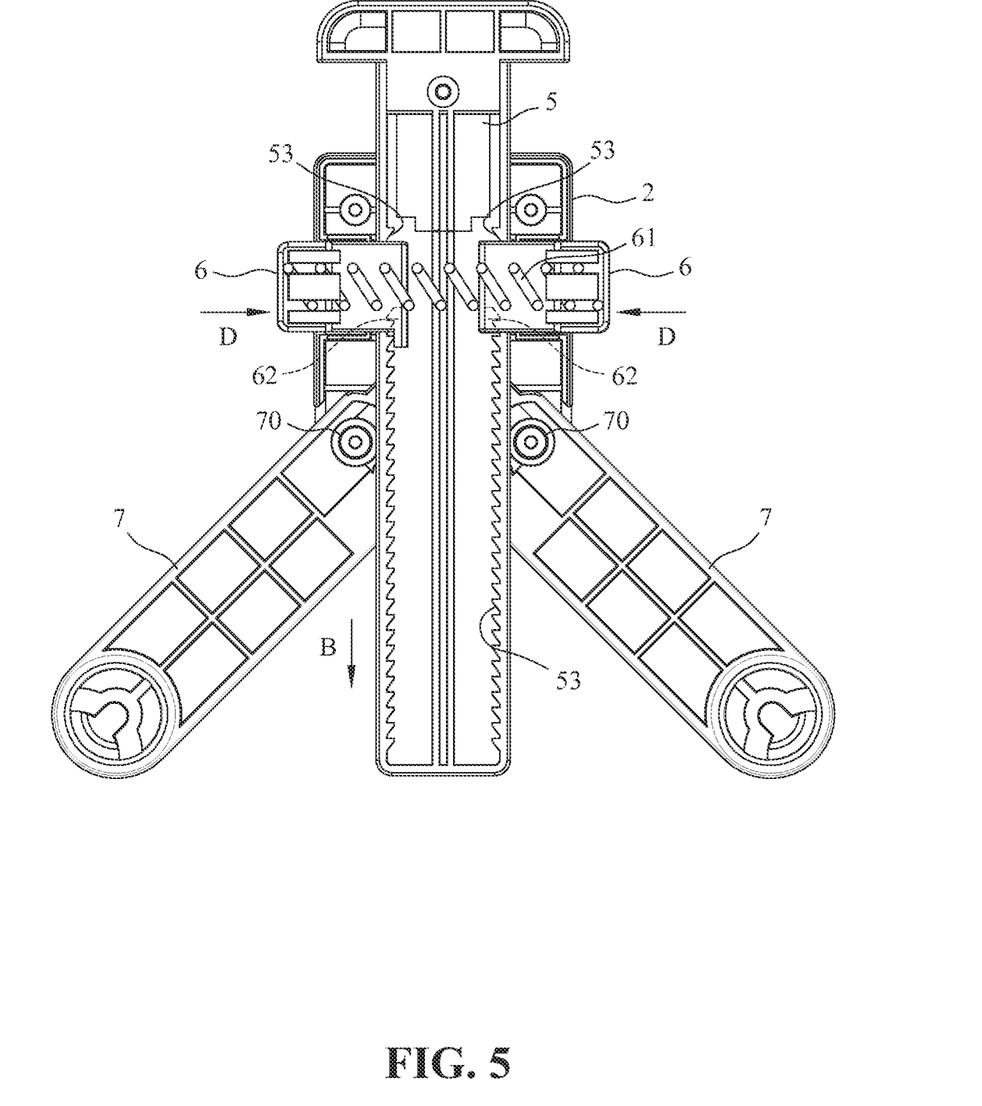
FIG. 5 illustrates another schematic view for the internal structure of the base unit, according to an exemplary embodiment.

According to the exemplary embodiment, FIG. 5 illustrates another schematic view for the internal structure of the base unit to primarily explain the position of the moving unit 5 is fixed or released. This institution is similar to the conventional structure, this is only a brief introduction here, and is not limited to this method. In the exemplary embodiment of the present disclosure there are only two release units 6 in the base unit 2 may move linearly (as shown in the direction of arrow D) and may not separate. A spring 61, located between the two release units 6, provides the restore power of position for the release unit 6 when the external force disappears. The release unit 6 has a convex tooth 62 (its position is not visible in the figure and is shown in dashed lines). While the inner wall of the bottom of the moving unit 5 has other two ratchets 53 with single direction, part of the ratchet 53 in FIG. 5 is masked by the release unit 6 and my not be seen. On the condition of no external force, the convex tooth 62 of the release unit 6 contacts with the ratchet tooth 53 due to the spring 61, then the moving unit 5 may only move in single direction (i.e. the clamping direction), such as the direction of arrow B in FIG. 5. If the release unit 6 is pressed to move, the convex tooth 62 separates from the ratchet 53, thus the moving unit 5 may move in the opposite direction of arrow B, which is releasing clamping state.

Figure 6:
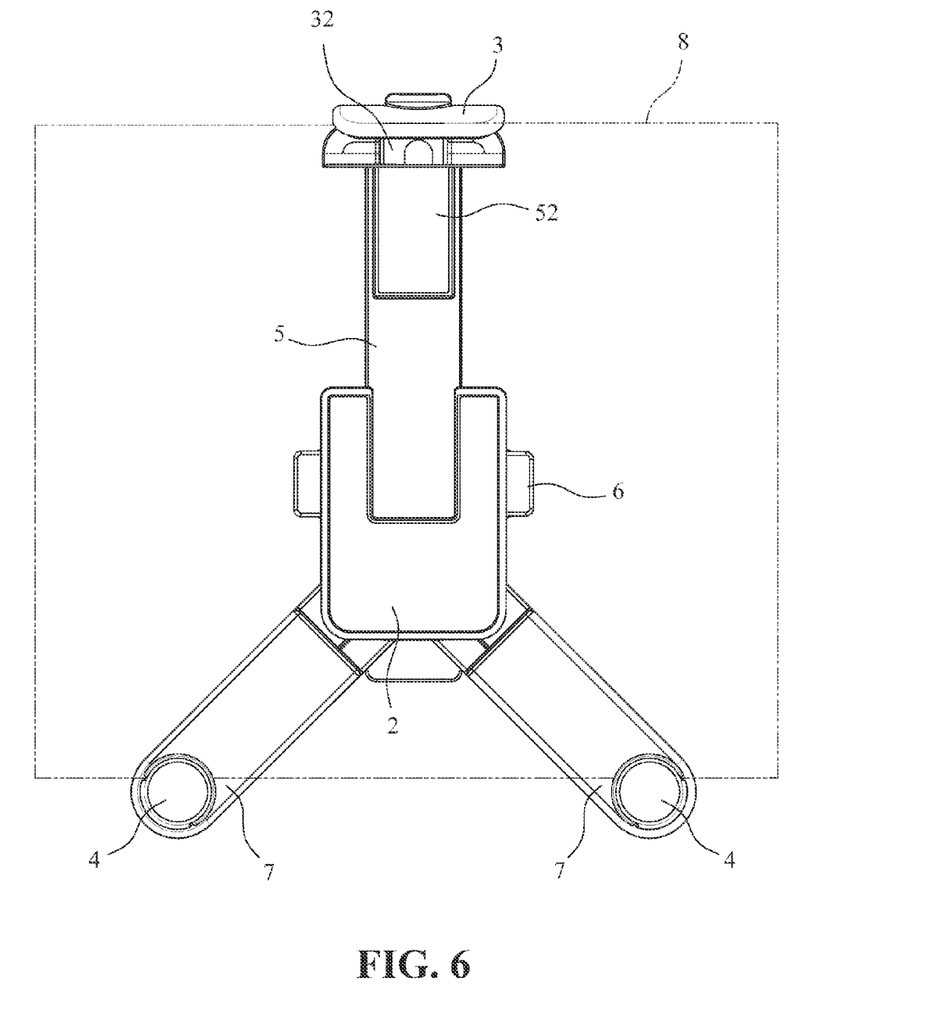
FIG. 6 illustrates a schematic view for the first usage pattern, according to an exemplary embodiment.
Figure 7:
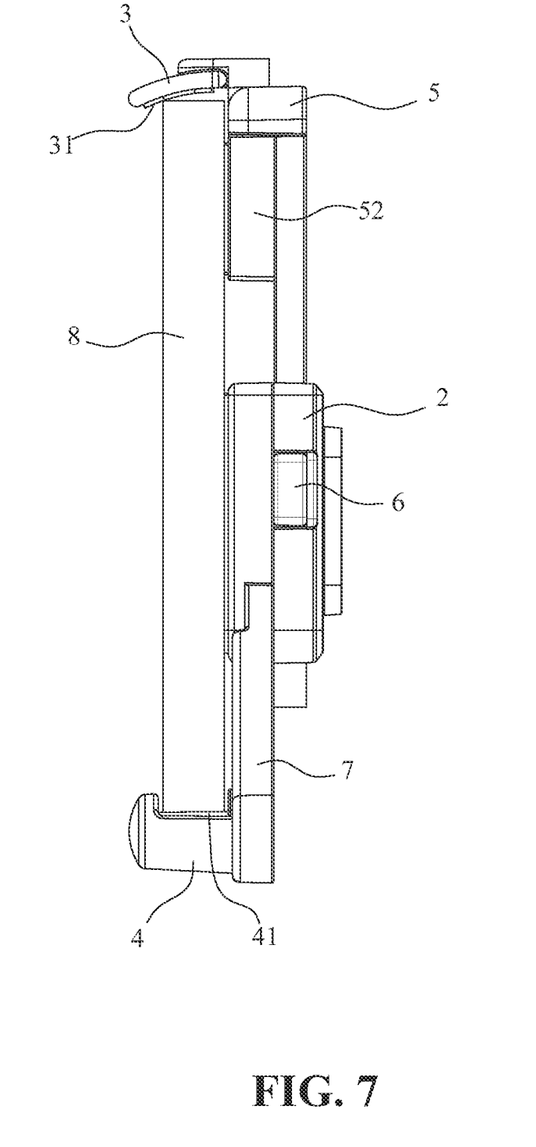
FIG. 7 illustrates a side view for the first usage pattern, according to an exemplary embodiment.
Figure 8:
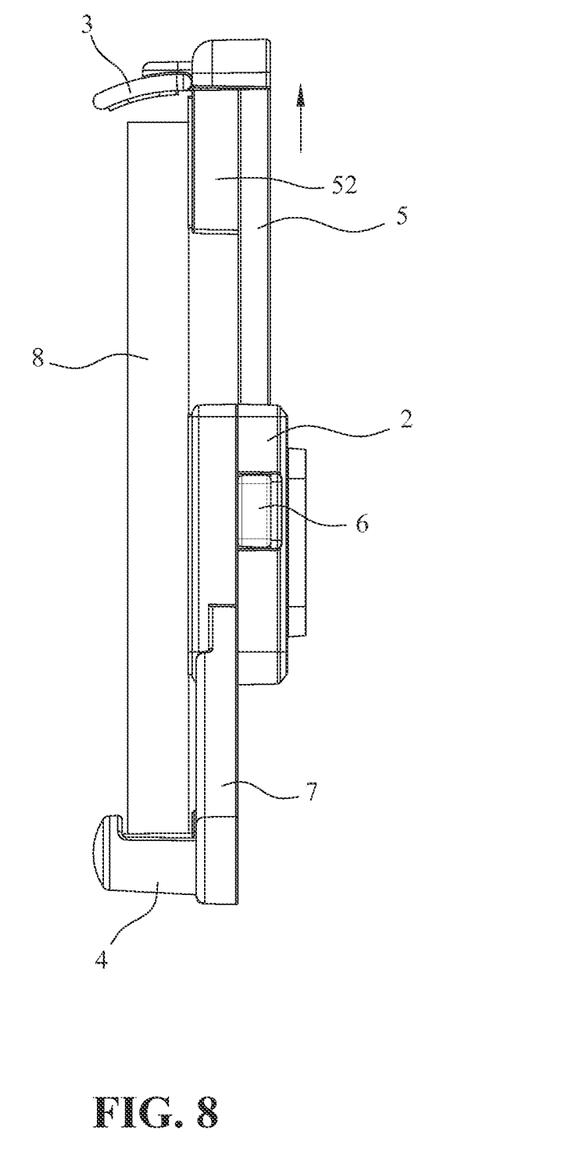
FIG. 8 illustrates a side view for releasing clamping state of the first usage pattern, according to an exemplary embodiment.

FIG. 6 and FIG. 7 illustrate a schematic view of major usage pattern, according to the exemplary embodiment. The two rotation units 7 are expanded to clamp a portable electronic product. According to the exemplary embodiment, the portable electronic product 8 is a tablet computer or wide screen mobile phone. As shown in FIG. 6, the portable electronic product 8 is indicated by imaginary lines in order to illustrate the position of each member. The exemplary embodiment adjusts the length of extending the base unit 2 by moving the moving unit 5 to, thereby the distance between the clamping member 3 and the stoppers 4 is shortened; and sidewalls of the portable electronic products are pressed at different locations by the clamping member 3 and the two stoppers 4, the portable electronic product is firmly fixed by using three points clamping method. Furthermore the clamping member 3 may move on the moving unit 5 opposite to the clamping direction for further increasing the clamping range. Also the housing case 52 has the elastic member 522 pulling the clamping member 3, thus the clamping force does not reduced. According to the exemplary embodiment, a special effect of usage is introduced by the design of the clamps 3 may move. In FIG. 7, the clamping member 3 has been pulled a short distance when clamped; the elastic member 522 is in the compressed state at this time. Once the release unit 6 is induced to release the clamping state, such as shown in FIG. 8, the moving unit 5 moves rapidly upward due to the forcing of the elastic member 522. After the steady state, the distance between the clamping member 3 and the stoppers 4 is slightly greater than the dimension of the portable electronic product 8, and thus user may easily remove the portable electronic product 8, also the portable electronic product 8 may not drop immediately when the clamping state released.

Figure 9:
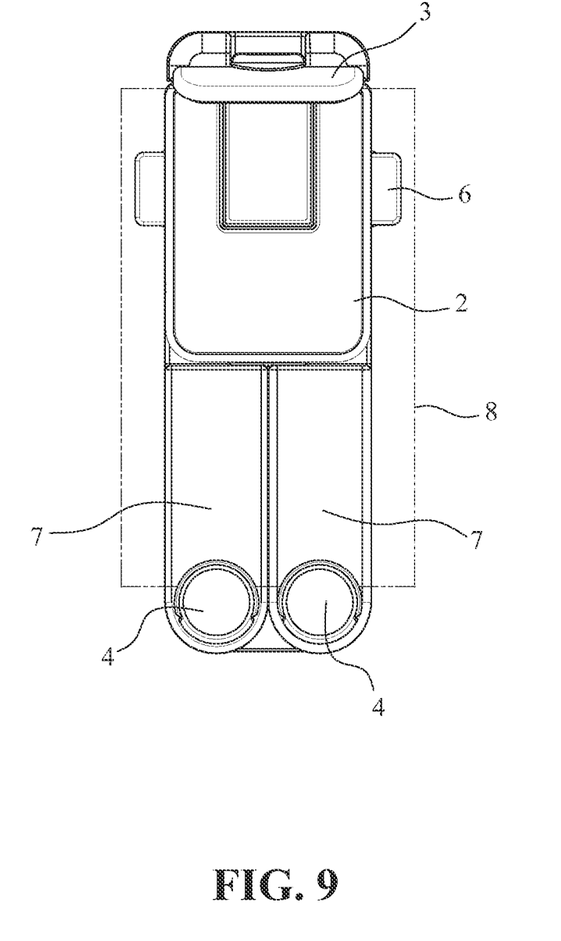
FIG. 9 illustrates a schematic view for the second usage pattern, according to an exemplary embodiment.

FIG. 9 illustrates a schematic view for another usage pattern, according to an exemplary embodiment. As shown in FIG. 9, when the two rotation units 7 closes alongside each other, the distance between the stoppers 4 is the shortest, and this portable electronic product 8 is usually a smart mobile phone, with a body type of, such as, a rectangular. The clamping method uses the clamping member 3 closing the stoppers 4 for clamping the portable electronic product. Other usage pattern is the same as the above exemplary embodiment and is not described. Therefore, the exemplary embodiments of the present disclosure may provide a clamping device for various electronic products of different dimensions.

Although the disclosure has been described with reference to the exemplary embodiments. It will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A clamping device adapted to electronic products of different dimensions, comprising:
   a base unit having a placement surface, said placement surface having left and right sides and providing a place for an electronic product;
   a clamping member and two stoppers, said clamping member and said stoppers being located at both the left and right sides of said placement surface, wherein said clamping member is able to move close to or away from said stoppers to clamp said electronic product between said clamping member and said two stoppers;
   a moving unit, partially penetrating said base unit and moving linearly, said clamping member being installed on said moving unit at an installation position being a section of said moving unit not entering said base unit, a position of said clamping member being adjusted by said moving unit; furthermore a bottom of said clamping member extending into said moving unit for short range movement opposite to a clamping direction, said moving unit having an elastic member, said elastic member providing restore power after said clamp changes position;
   a release unit, installed on said base unit, releases clamping state of said clamping member; and
   two rotation units, said rotation units having two ends, wherein one end pivotally connecting said base unit, the other end standing said stopper, said two rotation units taking pivotal connection as the center for said two stopper positions able to move close to or away from each other.

2. The device as claimed in claim 1, wherein a clamping surface of said stopper is a circular arc surface.

3. The device as claimed in claim 1, wherein a moving length of said moving unit is more than 1 time of the length of said base unit.

4. The device as claimed in claim 1, wherein said moving unit has a housing case, the bottom of said clamp member has a slider, said slider extends to said housing case, said housing case has at least one positioning member, and said positioning member makes said slider slide but not detach said housing case through an elongated guide hole on said slider.

5. The device as claimed in claim 1, wherein said elastic member is installed in a housing case.

6. The device as claimed in claim 1, wherein a housing case is located at the section of said moving unit not entering said base unit interior.

7. The device as claimed in claim 1, wherein the periphery of a pivotally connected end of said rotation unit has a number of cogging, and said base unit has a latch, said latch is an annular type, two opposite edges have a convex tooth, said convex tooth of said latch is compressed with offset, and said convex tooth is latched at corresponding alveolus of said rotation unit when assembled.

8. The device as claimed in claim 1, wherein a pivotally connected end of said rotation units further has a safety contact wall and cogging, said safety contact wall and said cogging are located at different heights, respectively, and said rotation unit is unable to be further rotated when said safety contact walls of said two rotation units are contacted each other.

* * * * *